US007936302B2

(12) United States Patent
Brandwood et al.

(10) Patent No.: US 7,936,302 B2
(45) Date of Patent: May 3, 2011

(54) UNWRAPPING OF PHASE VALUES AT ARRAY ANTENNA ELEMENTS

(75) Inventors: David Herbert Brandwood, Southhampton Hampshire (GB); Michael-Richard Richardson, Romsey Hampshire (GB)

(73) Assignee: Roke Manor Research Limited, Romsey (GB)

( * ) Notice: Subject to any disclaimer, the term of this patent is extended or adjusted under 35 U.S.C. 154(b) by 186 days.

(21) Appl. No.: 12/089,464

(22) PCT Filed: Oct. 5, 2006

(86) PCT No.: PCT/GB2006/050315

§ 371 (c)(1), (2), (4) Date: Sep. 18, 2008

(87) PCT Pub. No.: WO2007/039772

PCT Pub. Date: Apr. 12, 2007

(65) Prior Publication Data

US 2009/0219195 A1 Sep. 3, 2009

(30) Foreign Application Priority Data

Oct. 6, 2005 (GB) .................................. 0520332.8
Dec. 2, 2005 (GB) .................................. 0524624.4

(51) Int. Cl.
*G01S 7/40* (2006.01)
*G01S 13/00* (2006.01)
*G01S 7/02* (2006.01)

(52) U.S. Cl. ........ 342/174; 342/165; 342/173; 342/175; 342/195; 342/368; 342/377

(58) Field of Classification Search .............. 342/73–81, 342/89–103, 165–175, 176, 179, 189–197, 342/368–384, 25 R–25 F, 118, 350, 357.01–357.17, 342/385, 417, 442, 13–20, 146–158, 450–465; 356/450, 496, 511, 512; 382/100, 108; 375/316, 375/322, 324, 325, 344, 346; 324/300, 306, 324/307

See application file for complete search history.

(56) References Cited

U.S. PATENT DOCUMENTS 4,975,704 A * 12/1990 Gabriel et al. .............. 342/25 C
5,260,708 A * 11/1993 Auterman .................. 342/25 C (Continued)

FOREIGN PATENT DOCUMENTS

EP 0 713 261 A1 5/1996

(Continued)

OTHER PUBLICATIONS

International Search Report dated Feb. 1, 2007 (Four (4) pages).

(Continued)

*Primary Examiner* — Bernarr E Gregory
(74) *Attorney, Agent, or Firm* — Crowell & Moring LLP

(57) ABSTRACT

A method and apparatus are described for the unwrapping of a set of phase values observed for an incoming signal on a phased array antenna. The difference between values observed on adjacent elements in the array forms a first data set. The differences between adjacent ordinates in the first data set forms a second data set. The values in the second data set are rounded to the nearest whole multiple of one complete cycle before the differencing process is reversed to provide the values (representing a whole number of complete cycles) which are added to the observed phase values to provide the unwrapped phase values.

8 Claims, 8 Drawing Sheets

U.S. PATENT DOCUMENTS

| | | | | | |
|---|---|---|---|---|---|
| 5,307,070 | A | * | 4/1994 | Runge et al. | 342/25 D |
| 5,424,743 | A | * | 6/1995 | Ghiglia et al. | 342/25 C |
| 5,442,359 | A | * | 8/1995 | Rubin | 342/189 |
| 5,530,449 | A | | 6/1996 | Wache et al. | |
| 5,572,220 | A | * | 11/1996 | Cai | 342/442 |
| 5,608,405 | A | * | 3/1997 | Pritt | 342/25 C |
| 5,657,027 | A | | 8/1997 | Guymon, II et al. | |
| 5,659,318 | A | * | 8/1997 | Madsen et al. | 342/25 C |
| 5,701,074 | A | * | 12/1997 | Zhu | 324/307 |
| 5,726,656 | A | * | 3/1998 | Frankot | 342/25 C |
| 5,783,942 | A | * | 7/1998 | Bernstein et al. | 324/306 |
| 5,835,055 | A | * | 11/1998 | van der Kooij | 342/25 C |
| 5,923,278 | A | * | 7/1999 | Poehler et al. | 342/25 C |
| 5,923,279 | A | * | 7/1999 | Bamler et al. | 342/25 C |
| 5,955,993 | A | | 9/1999 | Houghton et al. | |
| 6,011,625 | A | * | 1/2000 | Glass | 342/25 C |
| 6,097,328 | A | * | 8/2000 | Frankot | 342/25 C |
| 6,107,953 | A | * | 8/2000 | Dwyer et al. | 342/25 F |
| 6,150,973 | A | * | 11/2000 | Pritt | 342/25 C |
| 6,570,534 | B2 | * | 5/2003 | Cohen et al. | 342/357.12 |
| 6,677,885 | B1 | * | 1/2004 | Frankot | 342/25 R |
| 6,703,835 | B2 | * | 3/2004 | Patch et al. | 324/307 |
| 6,762,714 | B2 | * | 7/2004 | Cohen et al. | 375/325 |
| 6,891,370 | B2 | * | 5/2005 | Cline et al. | 324/307 |
| 6,954,173 | B2 | | 10/2005 | Mrstik | |
| 6,985,605 | B2 | * | 1/2006 | Ueki et al. | 382/108 |
| 7,173,563 | B2 | | 2/2007 | Boonstra et al. | |
| 7,305,053 | B2 | * | 12/2007 | Van Houtum | 375/346 |
| 2005/0001760 | A1 | | 1/2005 | Mrstik | |

FOREIGN PATENT DOCUMENTS

| | | | |
|---|---|---|---|
| GB | 2 171 849 | A | 9/1986 |
| GB | 2 386 947 | A | 10/2003 |
| WO | WO 96/09558 | A1 | 3/1996 |
| WO | WO 2004/017090 | A1 | 2/2004 |

OTHER PUBLICATIONS

Form PCT/ISA/220 and Form PCT/ISA/237 dated Feb. 1, 2007 (Seven (7) pages).

O. Grellier et al., "Self Calibration in Presence of Correlated Discrete Sources", EUSIPCO, published 1998, pp. 185-188, vol. 9.

D. M. Fernandez et al., "Calibration of HF Radar Systems with Ships of Opportunity", IEEE 2003 Internationsl Geoscience and Remote Sensing Symposium. Proceedings, Jul. 21-25, 2003, pp. 4271-4273, vol. 7 of 7, Toulouse, France, New York, NY.

M. P. Wylie et al., Joint DOA Estimation and Phase Calibration of Linear Equispaced (LES) Arrays, IEEE Transaction on Signal Processing, 1994, pp. 3449-3459, vol. 42, No. 12, New York, NY.

T. A. Valentic et al., "Self-Survey Calibration of Meteror Radar Antenna Arrays", IEEE Transactions on Geoscience and Remote Sensing, May 3, 1997, pp. 524-531, vol. 35, No. 3.

Great Britain Search Report dated Feb. 16, 2006.

Great Britain Search Report dated Feb. 8, 2006.

International Search Report dated Feb. 9, 2007.

PCT/ISA/237 Form.

* cited by examiner

UNWRAPPING OF PHASE VALUES AT ARRAY ANTENNA ELEMENTS

This application is a national stage of PCT International Application No. PCT/GB2006/050315, filed Oct. 15, 2006, which claims priority under 35 U.S.C. §119 to British Patent Application Nos. 0520332.8, filed Oct. 6, 2005 and 0524624.4, filed Dec. 2, 2005, the entire disclosures of which are herein expressly incorporated by reference.

The invention is concerned with the calibration of phased array antennas of the type used in applications such as Direction Finding (DF), signal separation and enhanced reception or simple beam steering.

BACKGROUND OF THE INVENTION

These techniques are well known but one problem commonly encountered is that knowledge is required of the response of the array to signals arriving from different directions.

The set of complex responses across an array of n elements may be termed a point response vector (PRV) and the complete set of these vectors over all directions is known as the array manifold (of n dimensions). Normally a finite sampled form of the manifold is stored for use in the DF processing.

The (sampled) manifold can be obtained, in principle, either by calibration or by calculation or perhaps by a combination of these. Calibration, particularly over two angle dimensions (for example azimuth and elevation) is difficult and expensive, and calculation, particularly for arrays of simple elements, is much more convenient. In this case, if the positions of the elements are known accurately (to a small fraction of a wavelength, preferably less than 1%) the relative phases of a signal arriving from a given direction can be calculated easily, at the frequency to be used. The relative amplitudes should also be known as functions of direction, particularly for simple elements, such as monopoles or loops. If the elements are all similar and oriented in the same direction then the situation corresponds to one of equal, parallel pattern elements, and the relative gains across the set of elements are all unity for all directions.

The problem with calculating the array response is that this will not necessarily match the actual response for various reasons. One reason is that the signal may arrive after some degree of multipath propagation, which will distort the response. Another is that the array positions may not be specified accurately, and another that the element responses may not be as close to ideal as required. Nevertheless, in many practical systems these errors are all low enough to permit satisfactory performance to be achieved. However, one further source of error that it is important to eliminate, or reduce to a low level, is the matching of the channels between the elements and the points at which the received signals are digitized, and from which point no further significant errors can be introduced (FIG. 1). These channels should be accurately matched in phase and amplitude responses so that the signals when digitized are at the same relative amplitudes and phases as at the element outputs, and as given by the calculated manifold.

One solution to channel calibration is to feed an identical test signal into all the channels immediately after the elements. The relative levels and phases of these after digitization give directly the compensation (as the negative phase and reciprocal amplitude factor) which could be conveniently applied digitally to all signals before processing, when using the system (FIG. 2). This works well, but requires careful engineering to ensure the equality of the coupling and the accurate matching across the channels of the test signal, and may not be a feasible solution in all cases.

One problem which arises during the measurement of phase angles is that of 'unwrapping' the measured value. The indicated value will lie within a range having a magnitude of 360° (or 2π radians) with no indication of whether the true value equals this indicated value or includes a whole number multiple of 360°/2π radians. The term 'unwrapping' is used in the art to describe the process of resolving such indicated values to determine the true values.

SUMMARY OF THE INVENTION

According to a first aspect of the invention, a method of processing a signal comprises the steps of:

(i) receiving the signal at a set of n loci;

(ii) measuring the phase of the signal at each locus to produce a set of n sequential phase values;

(iii) calculating the differences between neighboring phase values in the sequence according to:

$$\mathrm{DIFF1}_k=\Phi\mathrm{measured}_{k+1}-\Phi\mathrm{measured}_k\ (k=1\text{ to n}-1)$$

where $\Phi\mathrm{measured}_K$ is the kth phase value in the sequence;

(iv) calculating the differences between neighboring values of $\mathrm{DIFF1}_k$ according to:

$$\mathrm{DIFF2}_k=\mathrm{DIFF1}_{k+1}-\mathrm{DIFF1}_k\ (k=1\text{ to }n-2)$$

(v) rounding the values of $\mathrm{DIFF2}_k$ to the nearest integral multiple of complete phase cycles to produce the set of rounded values $\mathrm{DIFF}_k$ ;

(vi) summing neighboring values in the set of rounded values $\mathrm{DIFF}_k$ to provide a set of values, $d\Phi_k$, according to:

$$d\Phi_{k+1}=d\Phi_k+\mathrm{Diff}_k\ d\Phi_1=0\ (k=1\text{ to }n-2);$$

(vii) summing neighboring values of $d\Phi_k$ to give the set of values $\Phi_k$ according to:

$$\Phi_{k+1}=\Phi_k+d\Phi_k\ \Phi_0=0\ (k=1\text{ to }n-1);$$

and (viii) adding the values $\Phi_k$ to the corresponding values $\Phi\mathrm{measured}_k$ to produce the unwrapped phase values.

According to a second aspect of the invention, apparatus for processing a signal comprises:

(i) means for receiving the signal at a set of n loci, (ii) means for measuring the phase of the signal at each locus to produce a set of n sequential phase values;

(iii) means for calculating the differences between neighboring phase values in the sequence according to:

$$\mathrm{DIFF1}_k=\Phi\mathrm{measured}_{k+1}-\Phi\mathrm{measured}_k\ (k=1\text{ to }n-1)$$

where $\Phi\mathrm{measured}_k$ is the kth phase value in the sequence;

(iv) means for calculating the differences between neighboring values of $\mathrm{DIFF1}_k$ according to:

$$\mathrm{DIFF2}_k=\mathrm{DIFF1}_{k+1}-\mathrm{DIFF1}_k\ (k=1\text{ to }n-2)$$

(v) means for rounding the values of $\mathrm{DIFF2}_k$ to the nearest integral multiple of complete phase cycles to produce the set of rounded values $\mathrm{DIFF}_k$;

(vi) means for summing neighboring values in the set of rounded values $\mathrm{DIFF}_k$ to provide a set of values, $d\Phi_k$, according to:

$$d\Phi_{k+1}=d\Phi_k+\mathrm{Diff}_k,\ \Phi_1=0\ (k=1\text{ to }n-2)$$

(vii) means for summing neighboring values of $d\Phi_k$ to give the set of values $\Phi_k$ according to:

$$\Phi_{k+1}=\Phi_k+d\Phi_k,\ \Phi_0=(k=1\text{ to }n-1)$$

(viii) means for adding the values $\Phi_k$ to the corresponding values $\Phi\mathrm{measured}_k$ to produce unwrapped phase values.

For any array, the phase response across the array is a funcion of the element positions. For example, for a linear array the phase response across the array is a linear function of the element positions along the axis of the array, and this is the case whatever the direction of the observed signal (though the line has different slopes for different signal directions, of course). Thus if a signal of opportunity is available the received array phases are determined and the best linear fit to these values, as related to element position, is determined. It is assumed that this linear response is close to the ideal response for this signal and that the deviations of the received values from this line are the phase errors which require compensation. In the case of equal, parallel element patterns, the amplitude responses should be equal so variations, as factors, from a mean (in this case the geometric mean) give the required corrections.

Other objects, advantages and novel features of the present invention will become apparent from the following detailed description of the invention when considered in conjunction with the accompanying drawings.

DETAILED DESCRIPTION OF THE INVENTION

The following detailed description is concerned with the case of a one-dimensional antenna array having evenly spaced elements. However, this should not be seen as limiting as the invention is equally applicable to array antennas of other shapes or configuration (e.g., two dimensional planar, spherical etc), whether or not the array elements are evenly spaced (so long as the element positions are known).

Figure 1:
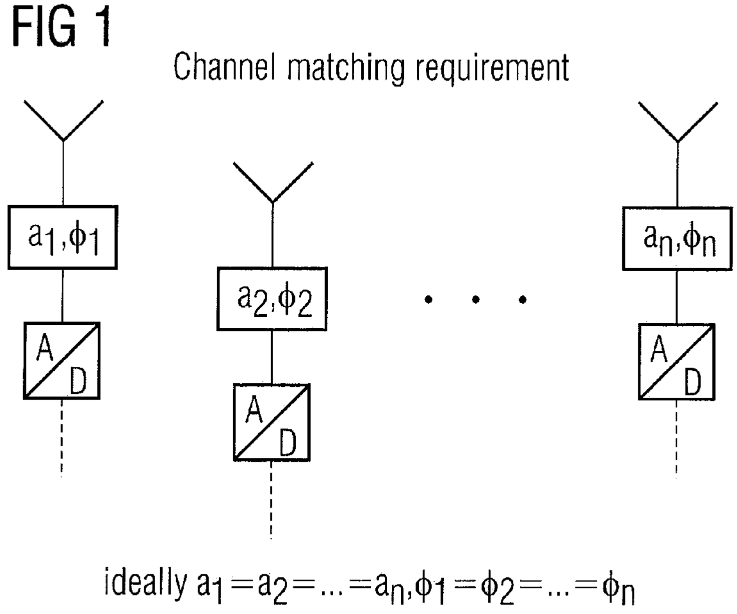
FIG. 1 is illustrates the requirement of matching signal channels in a phased array antenna.
Figure 2:
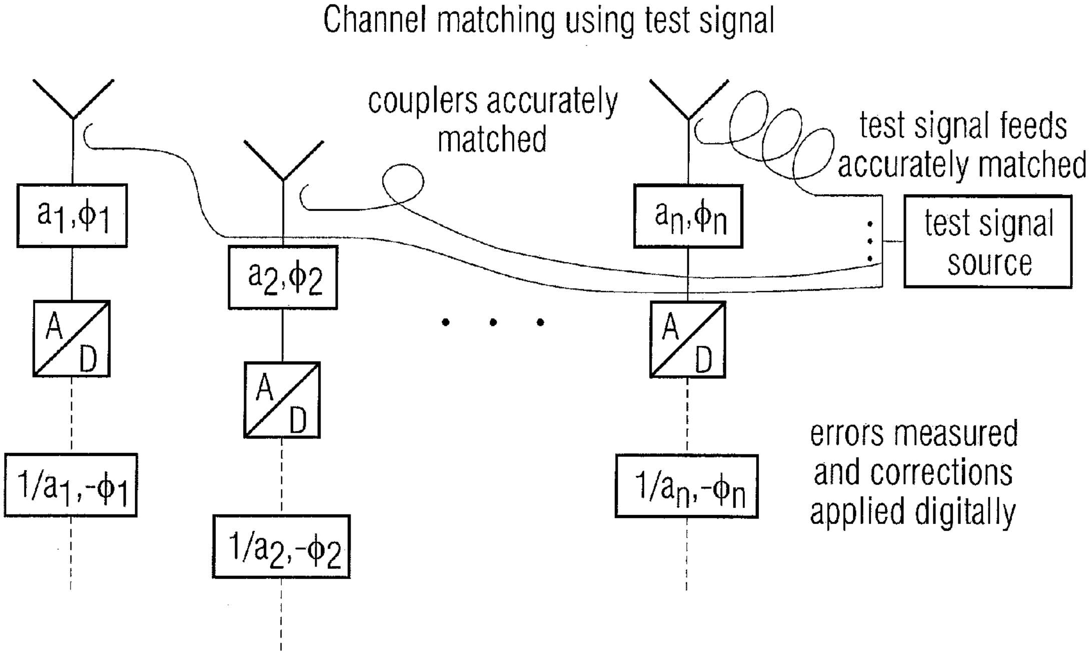
FIG 2 Prior Art
FIG. 2 illustrates a known method of calibrating an antenna array.
Figure 3:
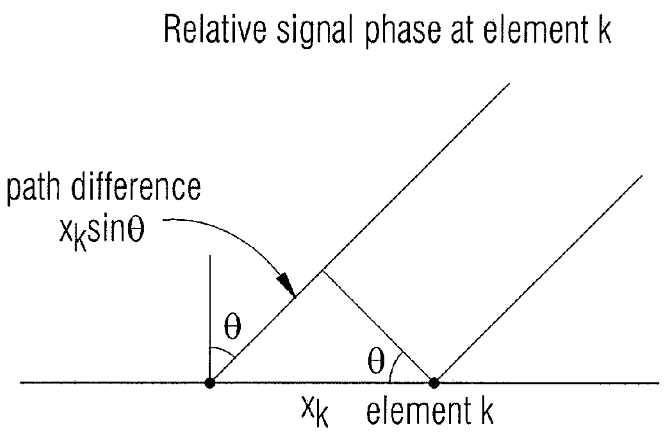
FIG. 3 shows a signal of opportunity incident on a phased array antenna.

Referring to FIG. 3, the phase of the signal at element k relative to its phase at the origin for the element position coordinate is given by $\phi k=2\pi xk \sin\theta/\lambda$ radians, where xk is the position of element k along the axis of the array, θ is the signal direction measured from the normal to the array and λ is the wavelength at the frequency of the signal. The path difference is xk sin θ in length units, xk sin θ/λ in units of wavelengths and one wavelength corresponds to 2π radians of phase shift. Note that if xk is large enough, for example more than two wavelengths, and the angle of incidence is not too small, for example greater than 30°, then the path difference is more than one wavelength, giving a phase difference of more than 2π radians. The phase measurement must be within a range of 2π (for example in [0,2π) or (−π,π]) so the measured value will be too low by one cycle, or 2π radians, and this must be corrected by the right number of cycles, for each of the channel phase measurements.

Here it is assumed that the relative phases have been found and that the required multiples of 2π have been added to make the phases approximately linear with element position along the array axis. This process is known as unwrapping the phase values.

A number of approaches to the problem of phase unwrapping are possible and further details on how the problem may be approached are included later.

Figure 4:
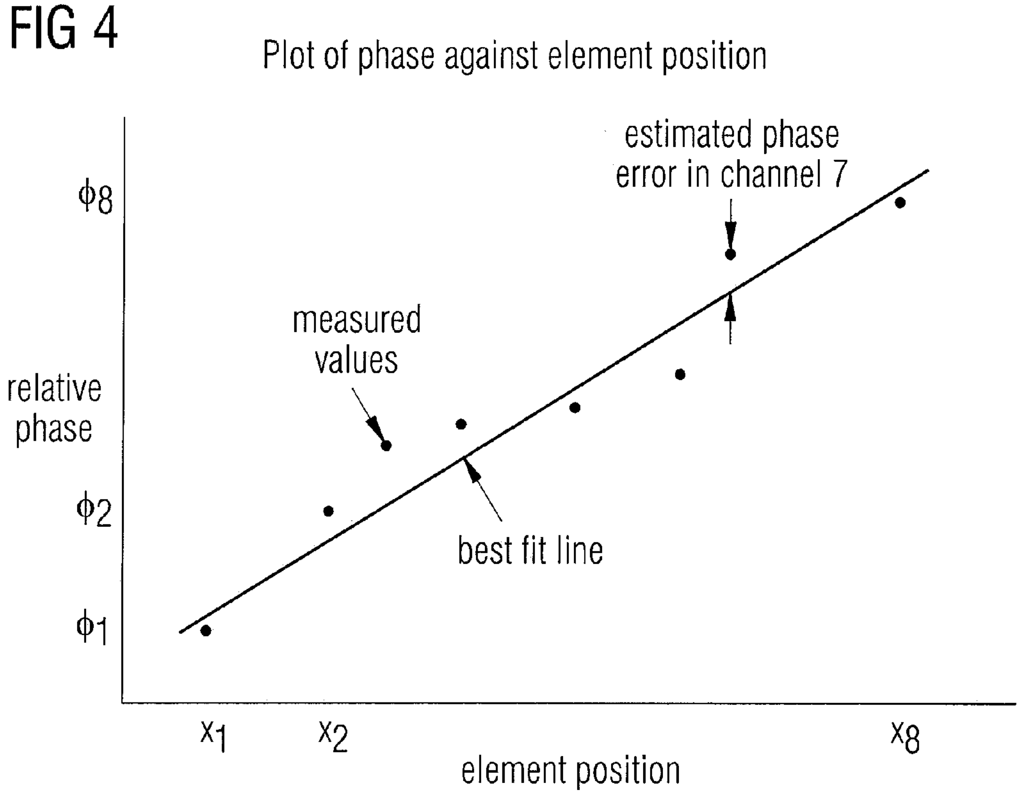
FIG. 4 shows a plot of phase against element position in a linear phased array antenna.

Since the phase ϕk for each element k is directly proportional to the position xk, a plot of the (correctly adjusted) phase shifts against element positions should provide a straight line. This is the case, whatever the value of θ, the signal direction; the value of θ (and of λ) will determine the slope of the line. In practice, there will be channel phase errors which add to these path difference phases, so that the (corrected) phase values will be scattered about the line, rather than lying exactly on it (FIG. 4). Moreover the linear relationship holds whatever the values of xk, so this calibration method is applicable to irregular linear arrays; there is no requirement for the array to be regular.

The basis of one aspect of the invention is that, given the phase measurements and the element positions, the straight line through this set of points which gives the best fit, in some sense, is found and it is assumed that this is close to the response due to the signal. In fact it is only necessary that the slope of this line should agree with the slope due to the signal (which is 2π sin θ/λ) as any phase offset which is common to all the channels is of no physical significance. In fact if the actual signal direction is not known, then the correct slope will not be known, and the 'best fit' line may not have this slope exactly. However, if there is no correlation between the phase errors and the element positions, as would generally be expected to be the case, and if there is a sufficient number of elements to smooth statistical fluctuations adequately, then the match should be good. For a definition of 'best fit' the sum of the squares of the errors (of the given points from the line) should be minimized—i.e., a least mean square error solution is sought.

Let the element positions and the phases be given by $$x=[x1\ x2\ \ldots\ xn]^T \text{ and } p=[p1\ p2\ \ldots\ pn]^T$$

respectively, where xk and pk are the position of element k and the phase measured in channel k. Let $$p=ax+b \tag{1}$$

be the best fit line, where a and b have yet to be determined. The errors of the measured points from this line is given by $$e=p-(ax+b1) \tag{2}$$

where x contains the n element positions so ax+b1 are the n phases at these points, given by the best fit line. The sum of the squared errors is given by $$E=\sum_{k=1}^{n} e_k^2 = e^T e = (p-(ax+b1))^T(p-(ax+b1)) \tag{3}$$

where 1 is the n-vector of ones, $[1\ 1\ \ldots\ 1]^T$. For any given a the task is to find b which minimizes the total squared error, s. Thus:

$$\begin{aligned}\frac{\partial E}{\partial b} &= -1^T(p-(ax+b1)) + (p-(ax+b1))^T(-1) \\ &= -21^T(p-(ax+b1)),\end{aligned} \tag{4}$$

(using $u^Tv=v^Tu$ for any vectors u and v of equal length). This derivative is zero when $$1^T(p-(ax+b1))=1^Tp-(a1^Tx+b1^T1)=n\bar{p}-(an\bar{x}+nb)=0,$$

or $$b=\bar{p}-a\bar{x}. \tag{5}$$

Here $$n\bar{p} = 1^T p = \sum_{k=1}^{n} p_k$$

—i.e. $\bar{p}$ is the mean of the components of p, and similarly for $\bar{x}$. (NB The solution for b, which, from (4) and (2), can be written $1^Te=0$, is the same as the requirement that the sum of the errors should be zero.)

With this value for b the line becomes $p=\bar{p}+a(x-\bar{x})$, and the set of errors becomes $$e=p-\bar{p}1-a(x-\bar{x}1)=\Delta p-a\Delta x \tag{6}$$

with the definition that $\Delta p=p-\bar{p}1$, the set of phase differences from the mean value, and similarly for $\Delta x$.

The total squared error is now given by $$E=(\Delta p-a\Delta x)^T(\Delta p-a\Delta x)=\Delta p^T\Delta p-2a\Delta x^T\Delta p+a^2\Delta x^T\Delta x.$$

Thus $$\frac{dE}{da} = -2\Delta x^T\Delta p + 2a\Delta x^T\Delta x$$

and this is zero when $$a = \frac{\Delta x^T\Delta p}{\Delta x^T\Delta x} = \frac{\sum_{k=1}^{n}(x_k-\bar{x})(p_k-\bar{p})}{\sum_{k=1}^{n}(x_k-\bar{x})^2}. \tag{7}$$

This is the estimate of the slope of the best fit line, and putting this into the expression for e (equation (6)) gives the estimate of the channel phase matching error Channel Phase Calibration for Planar and Volume Arrays This method of the invention can be extended to apply for planar arrays and for volume, or 3D, arrays. In the planar case the phase at an element k, relative to that at the origin, is given by $$\phi_k=(2\pi/\lambda)(ux_k+vy_k) \tag{8}$$

where the coordinates for the position of element k are ($x_k$, $y_k$,0) and (u,v,w) are the direction cosines for the signal position (u replaces sin θ in the linear case) using the same coordinate system. (The path difference is the projection of the position vector $[x_k\ y_k\ 0]$ onto the unit signal direction vector [u v w], and this is given by their inner product. Again the path difference is converted into radians of phase shift at the signal frequency by multiplying by 2π/λ.) As in the linear array case the phase is a linear function of the element position, in this case in two dimensions. Ideally the phase values from a single signal will all lie in a plane so in this case the plane that is the best fit through the set of measured points is sought. Let the plane be given by $$p=ax+by+c \tag{9}$$

then the errors (the difference between the measured phases p and the line) are given by $$e=p-(ax+by+c1) \tag{10}$$

and applying the result found for a linear array above, that the sum of the errors should be zero (or $1^Te=0$), gives $$0=1^Tp-(a1^Tx+b1^Ty+c1^T1)=n\bar{p}-(an\bar{x}+bn\bar{y}+cn)$$

so $$c=\bar{p}-(a\bar{x}+b\bar{y}) \tag{11}$$

and $$e=p-\bar{p}1-(a(x-\bar{x}1)+b(y-\bar{y}1))-\Delta p-(a\Delta x+b\Delta y) \tag{12}$$

where, as before, $$n\bar{p} = \sum_{k=1}^{n} p_k$$

and $$\Delta p = p - \bar{p}1$$

or $$(\Delta p)_k = p_k - \bar{p},$$

and similarly for x and y.

The total squared error is given by $$E=e^Te=(\Delta p-(a\Delta x+b\Delta y))^T(\Delta p\ (a\Delta x+b\Delta y))$$

and in this case E must be minimized with respect to both a and b. Thus $$\frac{\partial E}{\partial a} = -2a\Delta x^T(\Delta p-(a\Delta x+b\Delta y)) = 0$$

and $$\frac{\partial E}{\partial b} = -2b\Delta y^T(\Delta p-(a\Delta x+b\Delta y)) = 0.$$

These are two simulataneous equations which can be put in the form $$\begin{bmatrix}\Delta x^T\Delta x & \Delta x^T\Delta y \\ \Delta y^T\Delta x & \Delta y^T\Delta y\end{bmatrix}\begin{bmatrix}a \\ b\end{bmatrix} = \begin{bmatrix}\Delta x^T\Delta p \\ \Delta y^T\Delta p\end{bmatrix} \tag{13}$$

or, introducing the notation $D_{xp}=\Delta x^T\Delta p$, etc., $$\begin{bmatrix}D_{xx} & D_{xy} \\ D_{yx} & D_{yy}\end{bmatrix}\begin{bmatrix}a \\ b\end{bmatrix} = \begin{bmatrix}D_{xp} \\ D_{yp}\end{bmatrix} \tag{14}$$

with the solution $$\begin{bmatrix} a \\ b \end{bmatrix} = \begin{bmatrix} D_{yy} & -D_{xy} \\ -D_{yx} & D_{xx} \end{bmatrix} \begin{bmatrix} D_{xp} \\ D_{yp} \end{bmatrix} \Big/ (D_{xx}D_{yy} - D_{xy}^2) \tag{15}$$

(using $D_{yx}=D_{xy}$).

For the volume arrays the phase of element k, again given by the inner product, is $$\phi_k=(2\pi/\lambda)(ux_k+vy_k+wz_k) \tag{16}$$

where the element position is $(x_k,y_k,z_k)$. The 3D hyperplane that the phases should lie on is given by $$p=ax+by+cz+d \tag{17}$$

and the errors are given by $$e=p-(ax+by+cz+d1). \tag{18}$$

Making the sum of the errors zero leads to $$e=p-\bar{p}1-(a(x-\bar{x}1)+b(y-\bar{y}1)+c(z-\bar{z}1))=\Delta p-(a\Delta x+b\Delta y+c\Delta z)$$

and then requiring that E should be minimized with respect to a, b and c, leads to $$\begin{bmatrix} D_{xx} & D_{xy} & D_{xz} \\ D_{yx} & D_{yy} & D_{yz} \\ D_{zx} & D_{zy} & D_{zz} \end{bmatrix} \begin{bmatrix} a \\ b \\ c \end{bmatrix} = \begin{bmatrix} D_{xp} \\ D_{yp} \\ D_{zp} \end{bmatrix} \tag{19}$$

which gives the required values of the three coefficients.

Channel Amplitude Calibration

In the case of equal parallel pattern elements the gains (as real amplitude, or modulus, factors) should all be equal. If the measured gains are $a_1, a_2, \ldots, a_n$ then the geometric mean of these $\hat{a}$, rather than the arithmetic means (as in the phase case) is taken, and then the error factors are $a_k/\hat{a}$ and the correction factors to be applied to the data before processing are the reciprocals of these. (Alternatively one could just apply factors $1/a_k$, so effectively setting the channel gains (including the gains of the array elements) to unity. As the set of n channel outputs can be scaled arbitrarily, this is equally valid, but may require changes to any thresholds, as level sensitive quantities.)

If the element patterns are not parallel (all with the same pattern shape and oriented in the same direction) then this calibration will only be valid for the direction of the signal used, which in general is not known. (Even if it is known, the calibration information could only be used for correcting the manifold vector for this single direction.) Thus this method is not applicable to mixed element arrays (e.g. containing monopoles and loops) or to arrays of similar elements (e.g. all loops) differently oriented. If the element patterns are parallel but not equal (i.e. if the array elements have different gains) then this calibration will effectively equalize all the gains, which will then agree with the stored manifold values (if this assumption has been made in computing the manifold vectors). However this will modify the channel noise levels, in the case of systems which are internal noise limited (rather than external noise limited as may be the case at HF), so that the noise is spatially 'non-white', which is undesirable in the processing. Thus this method is really limited to arrays with equal, parallel pattern elements, but this is in fact a very common form of array, and this calibration should be simple and effective for this ease. The method does not otherwise depend on the array geometry so is applicable to linear, planar or volume arrays.

Phase Unwrapping for Regular Linear Array

Considering the case of a regular linear array first, in the absence of errors the path differences between adjacent elements will all be the same, so also will be the resulting phase differences. However, the measured phases are all within an interval of $2\pi$ radians (e.g. $-\pi$ to $+\pi$) so if the cumulative phase at an element is outside this range then a multiple of $2\pi$ radians will be subtracted or added, in effect, to give the observed value. In order to obtain the linear relationship between phase and element position the correct phase shifts need to be found, adding or subtracting the correct multiples of $2\pi$ to the observed values. Taking the differences between all the adjacent elements yields some that correspond to the correct phase slope, say $\Delta\phi$, and some with a figure $2\pi$ higher or lower (e.g. $\Delta\phi-2\pi$). These steps in the set of differences indicate where the increments of $2\pi$ should be added in (and to all succeeding elements). However, with channel phase errors present the difference between ($\Delta\phi$+errors) and ($\Delta\phi-2\pi$+errors) is not a simple value of $2\pi$ and it is necessary to set some thresholds to decide whether a given value is in fact near to $\Delta\phi$ (which itself is not known, as the signal direction is not known) or near to $\Delta\phi-2\pi$. This problem is solved by taking a second set of differences—the differences between adjacent values of the first set. When there are two adjacent values of ($\Delta\phi$+errors) their difference is (zero+errors) and when adjacent values are ($\Delta\phi$+errors) and ($\Delta\phi-2\pi$+errors) the difference is ($2\pi$+errors). Thus all the second differences are near zero, $\pm 2\pi$, $\pm 4\pi$ and so on. To find the values that there would be without errors the set is simply rounded to the nearest value of $2\pi$ to get the correct, error free, second differences. (It is assumed that the errors are small enough that four such errors, some differing in sign, which accumulate in the second differences, do not reach $\pm\pi$ radians. An estimate of the standard deviation of the phase errors is given below, showing that up to 20° to 30° can be handled). In fact it is convenient to measure phase in cycles for this process, so that the second differences are rounded to the nearest integer.

Having found the integer values for the second differences in phase (measured in cycles) the process is now reversed: starting with the first difference set to zero, the next difference is obtained by incrementing by the first of the second differences, and so on. Having obtained the (error-free) set of first differences, now containing integer values (in cycles), this process is repeated to find the set of cycles to be added and then these are applied to the measured set of phases to obtain the full (unwrapped) set of phases.

The two differencing processes may be considered to be analogous to differentiation, the first reducing the linear slope to a constant value, $\Delta\phi$ (except for the integer cycle jumps), and the second reducing this constant to zero (where there are no jumps). Reversing the process is analogous to integration, which raises the problem of the arbitrary constant. In fact an error by one cycle (or more) may be present at the first difference stage, and integrating this contribution gives an additional slope of one phase cycle (or more) per element. However, the error estimation process described above is independent of the actual slope so the fact that the slope may be different from the true one makes no difference.

A more formal analysis of the phase correction determination is given below, including the solution for the case where the array is not regular. Here the second differences, used to eliminate u, have to take into account the irregular values of $d_k$ (and their first differences, $\Delta d_k$) so the expressions become more complicated.

Phase Unwrapping for a Linear Array

Uniform Linear Array (Array elements are evenly spaced).

Let the full phase in channel k be given by $$\Phi_k = d_k u + \phi_0 + \epsilon_k \ (k=1 \text{ to } n) \quad (A1)$$

where $d_k$ is the distance of element k along the array axis from some reference point, u is the direction cosine for the source direction along the array axis (in fact u=sinθ, where θ is the angle of the signal measured from the normal to the array axis), $\phi_0$ is a fixed phase value and $\epsilon_k$ is the channel phase error. It is often convenient in practice to take an end element of the array as the reference point, and then regard this as the reference channel, measuring all channel phases and amplitudes relative to those of this channel. The term $d_k u$ is the path difference for the signal, between the reference point and element k, measured in cycles, and all phases here arc in cycles, which is more convenient than radians or degrees for this problem, both in theory and in the practical computation. This phase may be many cycles (or multiples of 2π radians) but the measured phases will be within a range of 2π radians, or one cycle, and these are taken to be between −½ and +½ cycles and to be given by $$\phi_k = \Phi_k + m_k = d_k u + m_k + \phi_0 + \epsilon_k \ (k=1 \text{ to } n) \quad (A2)$$

where $m_k$ is the number of cycles added to the full phase value (or removed, if $m_k$ is negative). The problem in phase unwrapping is to find the values of $m_k$.

In order to remove $\phi_0$ and also the effect of the arbitrary choice of reference point the first differences are formed, given by $$\Delta\phi_k = u\Delta d + \Delta m_k + \Delta\epsilon_k \ (k=1 \text{ to } n-1) \quad (A3)$$

where $$\Delta x_k = x_{k+1} - x_k \quad (A4)$$

for x representing φ, d, m or ε, and $\Delta d_k = \Delta d$ as all the $\Delta d_k$ are equal for a uniform, or regular, array. Next, the second differences are taken to obtain $$\Delta^2\phi_k = \Delta^2 m_k + \Delta^2\epsilon_k \ (k=1 \text{ to } n-2) \quad (A5)$$

as the term uΔd is constant (with k) so its differences disappear. As all the values of $m_k$ are integral, so also are all their first and second differences. If the errors are not too great then the second differences in the errors ($\Delta^2\epsilon_k = \epsilon_{k+2} - 2\epsilon_{k+1} + \epsilon_k$) will be less than ½ in magnitude, so if the values of $\Delta^2\phi_k$ are rounded to the nearest integer the correct values for $\Delta^2 m_k$ are obtained. Let $$\Delta^2 M_k = \text{round}(\Delta^2\phi_k) = \text{int}(\Delta^2\phi_k + \tfrac{1}{2}) \quad (A6)$$

where int(x) gives the highest integer in x, then with moderate error levels $$\Delta^2 M_k = \Delta^2 m_k. \quad (A7)$$

will normally be obtained.

To find the values of $M_k$, a summing operation (the inverse of the differencing process) is carried out twice. From (A4), $$\Delta M_{k+1} = \Delta M_k + \Delta^2 M_k \ (k=1 \text{ to } n-2) \quad (A8)$$

but value for $\Delta M_1$ has not been defined. This is analogous to the ‘arbitrary constant’ of integration, which is set to zero here. The second reverse operation gives:

$$M_{k+1} = M_k + \Delta M_k \ (k=1 \text{ to } n-1) \quad (A9)$$

again putting $M_1$=0. Because these values of $M_1$ and $\Delta M_1$ may not be the same as $m_1$ and $\Delta m_1$ (which are not known) the resultant values of $m_k$ may not be the same as the values obtained for $M_k$, but it is now shown that the differences (if any) are of no significance for this calibration purpose, and that the set of $M_k$ values is equivalent to the actual set of $m_k$. In a processing program generated, (A4) was used twice to obtain the first and second differences of φ, before rounding, according to (A6), and then using (A8) and (A9) to obtain the set of $M_k$. Finally $\Phi_k$ is obtained from $\phi_k$ using $M_k$, ignoring any differences between $M_k$ and $m_k$.

Equivalence of Set {$M_k$} and {$m_k$}

Let $\Delta m_a$ and $m_b$ be the arbitrary choices (or constants of ‘integration’) taken for $\Delta M_1$ and $M_1$ respectively. Putting $$\Delta M_1 = \Delta m_a = (\Delta m_a - \Delta m_1) + \Delta m_1, \quad (A10)$$

the next first difference for ΔM is $$\Delta M_2 = \Delta M_1 + \Delta^2 M_1 = \Delta M_1 + \Delta^2 m_1 = \Delta M_1 + (\Delta m_2 - \Delta m_1) = (\Delta m_a - \Delta m_1) + \Delta m_2 \quad (A11)$$

where (A8), (A7), (A4) and (A10) have been used. Continuing, $$\Delta M_k = (\Delta m_a - \Delta m_1) + \Delta m_k \ (k=1 \text{ to } n-1) \quad (A12)$$

in general. Now let $$M_1 = m_b = (m_b - m_1) + m_1, \quad (A13)$$

then $$M_2 = M_1 + \Delta M_1 = (m_b - m_1) + m_1 + (\Delta m_a - \Delta m_1) + \Delta m_1 = (m_b - m_1) + (\Delta m_a - \Delta m_1) + m_2, \quad (A14)$$

using (A13), (A10) and (A4) ($\Delta m_1 = m_2 - m_1$). Note that every time $\Delta M_k$ is added, the quantity ($\Delta m_a - \Delta m_1$) is included, so that finally $$M_k = (m_b - m_1) + (k-1)(\Delta m_a - \Delta m_1) + m_k. \ (k=1 \text{ to } n) \quad (A15)$$

The term ($m_b - m_1$) is a constant phase shift (over all k) and the term (k−1)($\Delta m_a - \Delta m_1$) corresponds to a constant phase slope, so when the corrections $M_k$ are added to $\phi_k$ to obtain $\Phi_k$ the irregular jumps $m_k$ are correctly compensated for while adding an overall phase (when $m_b \neq m_1$) and a change in slope (when $\Delta m_a \neq \Delta m_1$). However, the phase error estimation of the invention is independent both of absolute phase and of the phase slope, so these differences do not affect the resultant estimates in any way.

Non-uniform Linear Array

The full phase is given by (A1) and the measured phase by (A2), but, in the case of the non-uniform linear array (A3) is replaced, for the first differences in phase, by $$\Delta\phi_k = u\Delta d_k + \Delta m_k + \Delta\epsilon_k. \ (k=1 \text{ to } n-1) \quad (A16)$$

In this equation the quantities $\Delta\phi_k$, $\Delta d_k$ are known, the error differences $\Delta\epsilon_k$ are not known but will be removed by rounding, at the appropriate point, and $\Delta m_k$ is to be found, for each k. However u is unknown and while it is removed by taking second differences in the uniform case, this will not be the case here because, in general $u\Delta d_{k+1}$ and $u\Delta d_k$ will differ so their difference does not disappear.

Rearranging the equation gives $$u = \frac{\Delta\phi_k - \Delta m_k - \Delta\varepsilon_k}{\Delta d_k} \quad (A17)$$

$$(k = 1 \text{ to } n-1)$$

and taking differences again, gives $$0 = \frac{\Delta\phi_{k+1} - \Delta m_{k+1} - \Delta\varepsilon_{k+1}}{\Delta d_{k+1}} - \frac{\Delta\phi_k - \Delta m_k - \Delta\varepsilon_k}{\Delta d_k}$$

$$(k = 1 \text{ to } n-2)$$

which is again rearranged as $$\Delta m_{k+1} = \Delta\phi_{k+1} + \frac{\Delta d_{k+1}(\Delta m_k - \Delta\phi_k)}{\Delta d_k} - \left(\Delta\varepsilon_{k+1} - \frac{\Delta d_{k+1}\Delta\varepsilon_k}{\Delta d_k}\right). \tag{A18}$$

It is known that $\Delta m_{k+1}$ is integral, so if the errors are not too great, as before, the relation $$\Delta m_{k+1} = \text{round}\left(\Delta\phi_{k+1} + \frac{\Delta d_{k+1}(\Delta m_k - \Delta\phi_k)}{\Delta d_k}\right). \quad (k = 1 \text{ to } n-2) \tag{A19}$$

holds.

From this equation (the first 'summation') all the $\Delta m_k$, given $\Delta m_1$ could be found. As this is not known $\Delta M_1$ is set to 0, and the set $\{\Delta M_k\}$ is found, equivalent, for the purpose of finding the best fit, to $\{m_k\}$, as shown in the section "Equivalence of set $\{M_k\}$ and $\{m_k\}$" above.

Thus with $\Delta M_1 - 0$ the equation $$\Delta M_{k+1} = \text{round}\left(\Delta\phi_{k+1} + \frac{\Delta d_{k+1}(\Delta M_k - \Delta\phi_k)}{\Delta d_k}\right) \quad (k = 1 \text{ to } n-2) \tag{A20}$$

is solved to obtain the set $\{\Delta M_k$: k=1 to n−1$\}$. T*hen* the set $\{M_k$: k=1 to n$\}$ is obtained as before, putting $\Delta M_1=0$, and using (A9).

Note that (A20) is the equation, for the non-uniform case, equivalent to (A8) for the uniform case. Putting $\Delta d_{k+1}=\Delta d_k$, for the linear case, then (A20) becomes $$\begin{aligned}\Delta M_{k+1} &= \text{round}(\Delta\phi_{k+1} + (\Delta M_k - \Delta\phi_k)) \\ &= \Delta M_k + \text{round}(\Delta\phi_{k+1} - \Delta\phi_k) \\ &= \Delta M_k + \Delta^2 M_k,\end{aligned} \tag{A21}$$

using the fact that $\Delta M_k$ is integral, and then equations (A4) and (A6).

Table 1 shows data derived from actual measurements using a one dimensional linear array with 10 equispaced elements.

For convenience & simplicity of explanation, channel 1 is taken as the measurement reference, so that all measured phase shifts are relative to channel 1.

Column 2 shows average values of measured phase relative to channel 1, calculated from a large number of acquired data (not shown).

Column 3 shows the results of the first differencing process, i.e. the difference in phase between adjacent array elements. The entries in column 3 are given by subtracting the corresponding entry in column 2 from the next entry in column 2.

Column 4 shows the results of the second differencing process: the entries in column 4 are given by subtracting the corresponding entry in column 3 from the next entry in column 3.

Column 5 shows $\text{Diff}_k$, (k=1 to 8), the set of second difference values of Column 4, rounded to the nearest multple of 360° and expressed in cycles through subsequent division by −360°. (The negative sign is required to ensure the phase unwrap values will have the correct sense).

The results in column 5 now need to be summed twice in order to obtain the phase unwrap values. The results of the first summation are given by:

$$d\Phi_{k+1} = d\Phi_k + \text{Diff}_k$$

$$d\Phi_1 = 0 \ (k=1 \text{ to } 8)$$

The results of the first summation are shown in column 6. The second summation is given by $$\Phi_{k+1} - \Phi_k + d\Phi_k$$

$$\Phi_0 = 0 \ (k=1 \text{ to } 9)$$

The results of the second summation are shown in column 7.

Since, in this example, the rounded second differences were optionally divided by −360° to give the values shown in column 5, the results of the second summation shown in column 7 are now multiplied by 360° to give the amount of phase unwrapping to be associated with each channel. Thus, the entries in column 8 show the values to be added to the measured phases for each of the channels, in order to establish the actual phase shift of each channel, relative to channel 1.

TABLE 1

| Channel No | Meas Phase wrt Ch 1 | First Diff deg | Second Diff deg | Second Diff in cycles, rounded to nearest - 360 deg | First Summation cycles | Second Summation cycles | Phase Unwrap deg |
|---|---|---|---|---|---|---|---|
| 1 | 0.00 | 106.38 | −58.57 | 0 | 0 | 0 | 0 |
| 2 | 106.38 | 47.81 | −313.85 | 1 | 0 | 0 | 0 |
| 3 | 154.18 | −266.05 | 443.91 | −1 | 1 | 0 | 0 |
| 4 | −111.86 | 177.86 | −117.14 | 0 | 0 | 1 | 360 |
| 5 | 66.00 | 60.73 | −322.31 | 1 | 0 | 1 | 360 |
| 6 | 126.73 | −261.59 | 263.79 | −1 | 1 | 1 | 360 |
| 7 | −134.86 | 2.21 | 107.94 | 0 | 0 | 2 | 720 |
| 8 | −132.65 | 110.15 | −80.02 | 0 | 0 | 2 | 720 |
| 9 | −22.51 | 30.12 | 0.00 | 0 | 0 | 2 | 720 |
| 10 | 7.62 | 0.00 | 0.00 | 0 | 0 | 2 | 720 |

Figure 5:
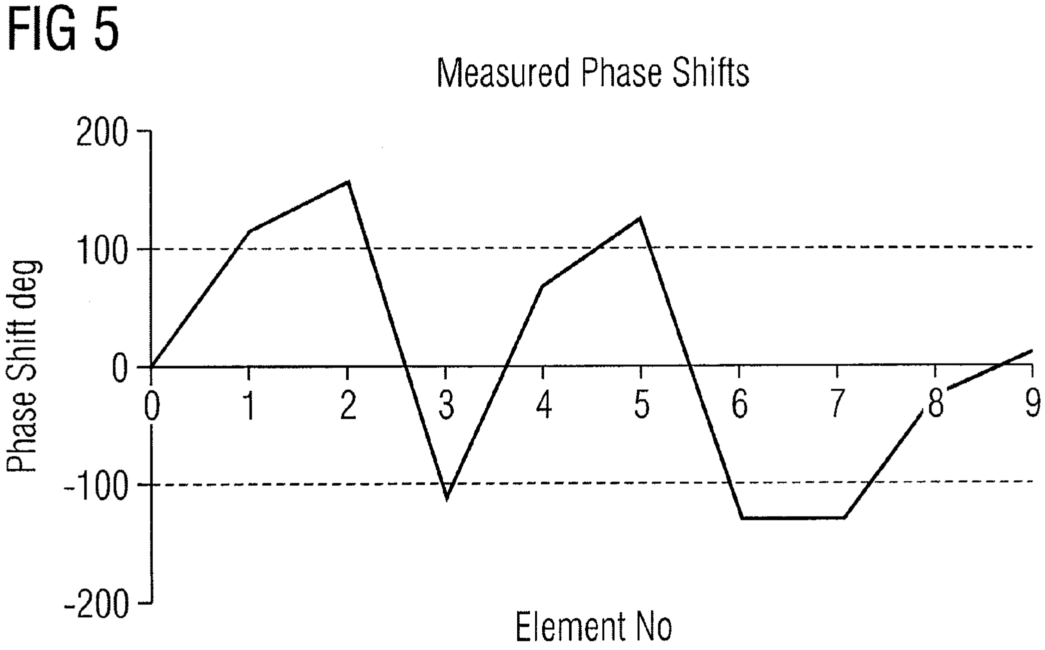
FIG. 5 shows a set of measured phase shifts prior to unwrapping in accordance with one aspect of the invention.

FIG. 5 shows a graphical representation of the measured data which generated the entries of table 1, column 2. The data was obtained on a horizontal linear array of 10 elements, working in the 950 MHz GSM band using cellular base stations as elevated transmitters of opportunity.

Figure 6:
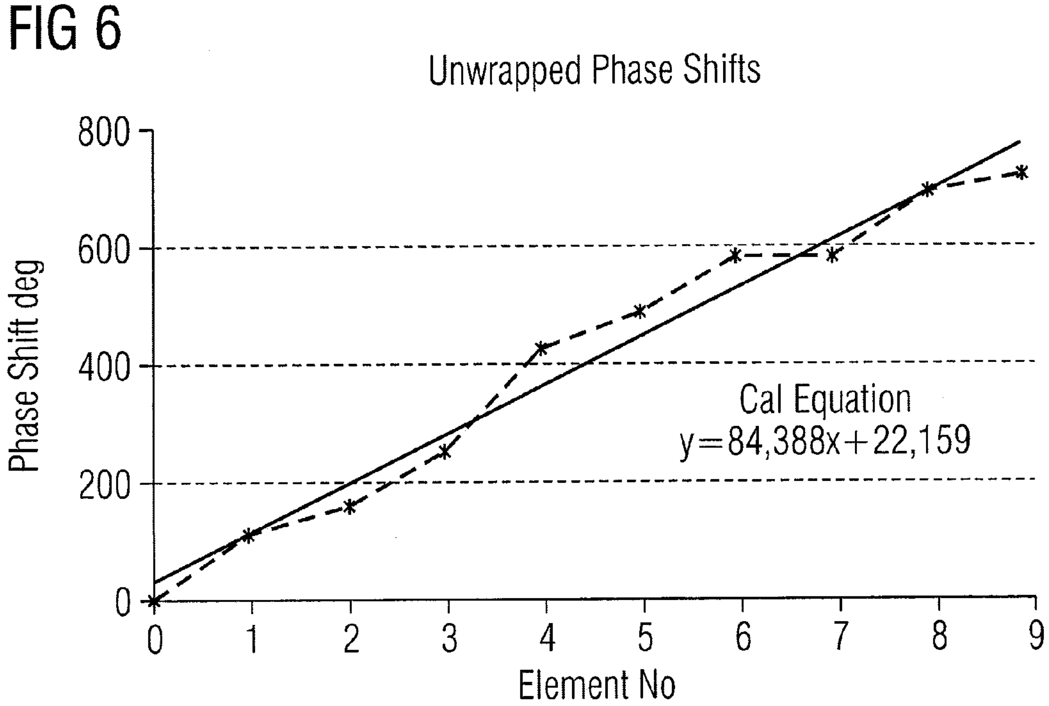
FIG. 6 shows the data represented in FIG. 5 after it has been subjected to unwrapping in accordance with the present invention.

FIG. 6 shows a plot (crosses) of the data after it was subjected to the phase unwrapping process of the invention. The solid line shows the line of best fit for these points which forms the basis of the array calibration according to the invention.

Figure 7:
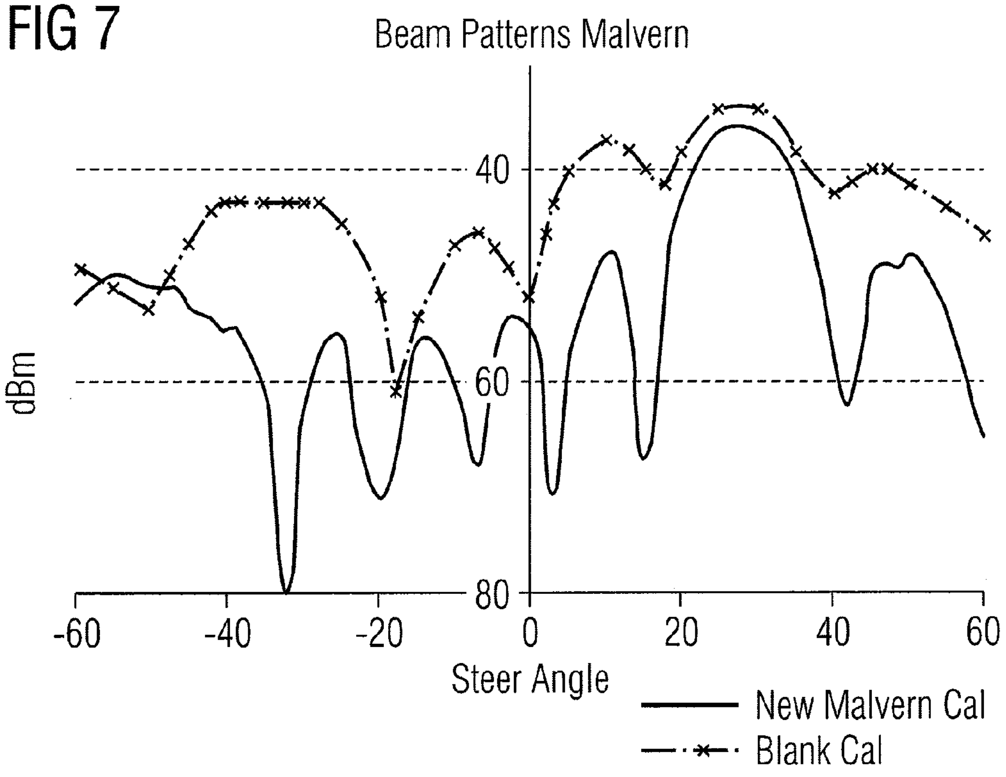
FIGS. 7 and 8 demonstrate the improvements to array antenna beam pattern that can be achieved on calibration in accordance with an aspect of the invention.

FIG. 7 shows synthetic beam patterns associated with the array used to generate the data of FIGS. 5 and 6. A marked improvement is seen between the pattern achieved before (crosses) and after (solid trace) calibration of the array in accordance with the current invention, using the calibration equation derived from FIG. 6. The signal of opportunity happened to arrive at an angle of 30° to the array in this example.

Figure 8:
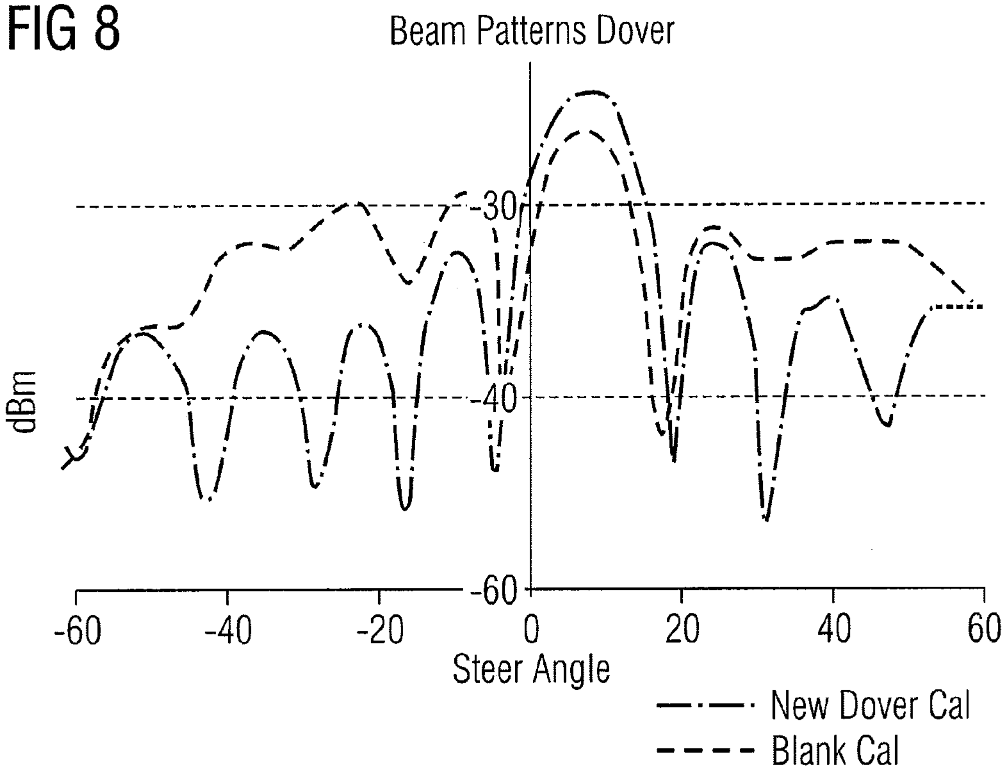

FIG. 8 represents another set of data for beam patterns achieved before (dotted line) and after (dots and dashes) calibration of the array according to the invention. Again, a marked improvement is seen. The signal of opportunity happened to arrive at an angle of 10° to the array in this example.

Simulation Results

A program has been written to simulate a phase error mismatch problem using a regular linear array, at half wavelength spacing. The three input arguments are n, the number of elements, θ, the angle of the signal source, relative to the normal to the axis of the array, and the standard deviation of the channel phase errors. On running the program a set of n channel phase errors are taken from a zero mean normal distribution with the given standard deviation. These are added to the phases at the elements due to the signal, from direction θ, which give the linear phase response. As mentioned previously, it is convenient to express these phases in cycles, rather than radians or degrees. These phases are then reduced, by subtracting a number of whole cycles from each, to the range −½ to +½ (equivalent to −π to +π radians), to give the values that would be measured. This is the basic data that the channel error estimation algorithm would be provided with.

The processing begins by 'unwrapping' the phases—restoring the cycles that have been removed from the approximately linear response. This is implemented by the process described previously, and relies on the errors being not too excessive. (The errors to the kth second difference are $\epsilon_k-2\epsilon_{k+1}+\epsilon_{k+2}$, where $\epsilon_k$ is the error in channel k. The variance at the second difference level is thus $6\sigma^2$ (from $\sigma^2+4\sigma^2+\sigma^2$) if $\sigma^2$ is the variance of the errors, so the standard deviation is increased √6 times. Thus for σ=30°, the s.d. of the second difference errors is about 73.5°, so ±180° corresponds to the 2.45 s.d. points, and the probability of exceeding these limits, and causing an error, is between 1% and 2%. If σ=20° errors occur at the 3.67 s.d. points, giving a probability of error of about $2\times10^{-4}$. This is the probability for each of the n−2 differences, not for the array as a whole.)

Having obtained the full path difference phase shifts, the processing for evaluating the estimate of the slope a of the best fit line from equation (7) is applied and then the estimate of the channel errors is found from equation (6).

Figure 9:
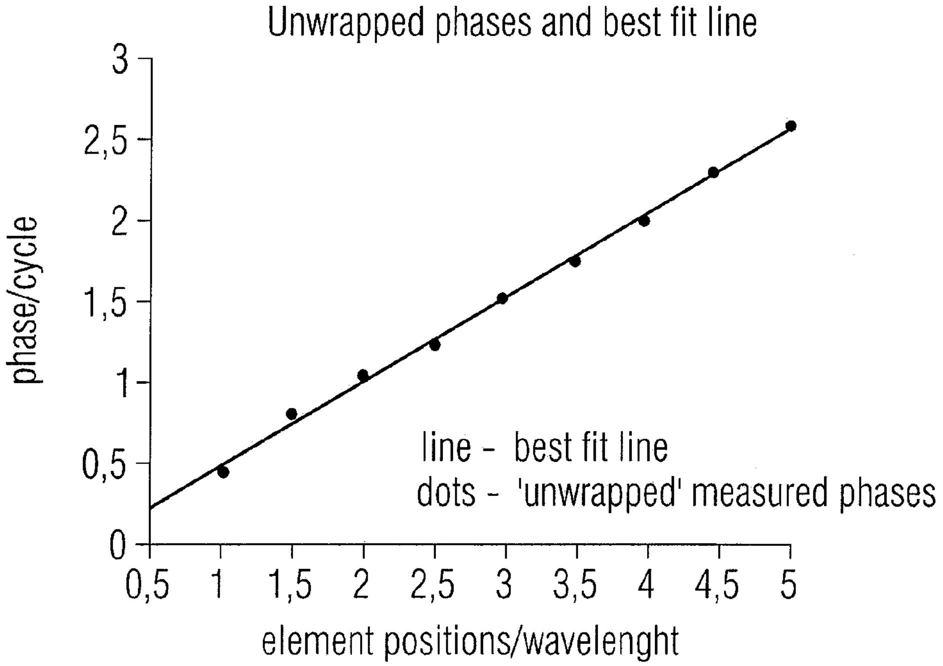
FIG. 9 a further plot of unwrapped phase against element position.
Figure 10:
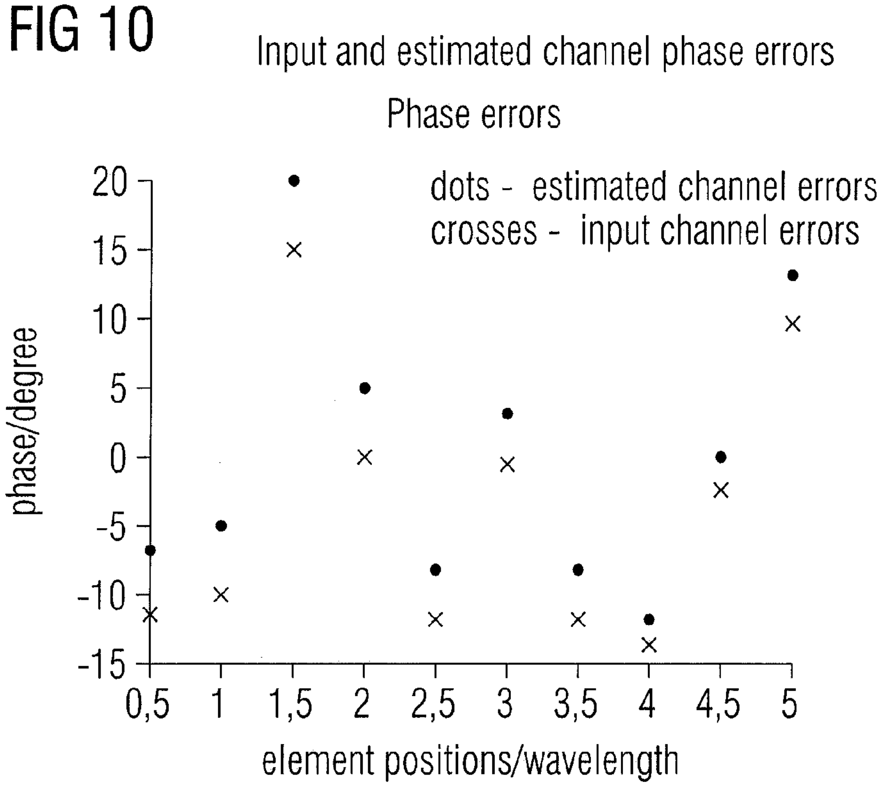
FIG. 10 shows a comparison of input and estimated channel phase errors

FIG. 9 is similar to FIG. 6, but is for an actual simulation example. In this case the signal direction was set at 30°, and the array contained 10 elements. The standard deviation for the error distribution was 10°. It should be noted that the adjusted ('unwrapped') measured phases (given by the dots) are very close to the line, whose slope is the rate of change of phase with position along the array axis, showing that the unwrapping has been achieved correctly. If this were not the case then there would be some dots shifted by an extra integral number of cycles from the line. FIG. 10 shows the input channel errors (crosses) and the estimates (dots). It can be seen that there is a general upward shift of the estimates, in this case. However, any consistent phase error can be removed as this is not physically significant (only phase differences matter).

TABLE 2

| | | | | | | | | | | |
|---|---|---|---|---|---|---|---|---|---|---|
| random errors/deg | −11.9 | −10.6 | 14.7 | 0.6 | −12.2 | −0.4 | −11.3 | −13.5 | −2.6 | 9.5 |
| unwrap errors/cyc | 0.0 | 0.0 | 0.0 | 0.0 | 0.0 | 0.0 | 0.0 | 0.0 | 0.0 | 0.0 |
| est'd errors/deg | −5.8 | −5.0 | 19.7 | 5.1 | −8.2 | 3.1 | −8.3 | −11.0 | −0.6 | 11.0 |
| match errors/deg | 6.0 | 5.5 | 5.0 | 4.5 | 4.0 | 3.5 | 3.0 | 2.5 | 2.0 | 1.5 |
| diff'l errors/deg | 2.3 | 1.8 | 1.3 | 0.8 | 0.3 | −0.3 | −0.8 | −1.3 | −1.8 | −2.3 |

Figure 11:
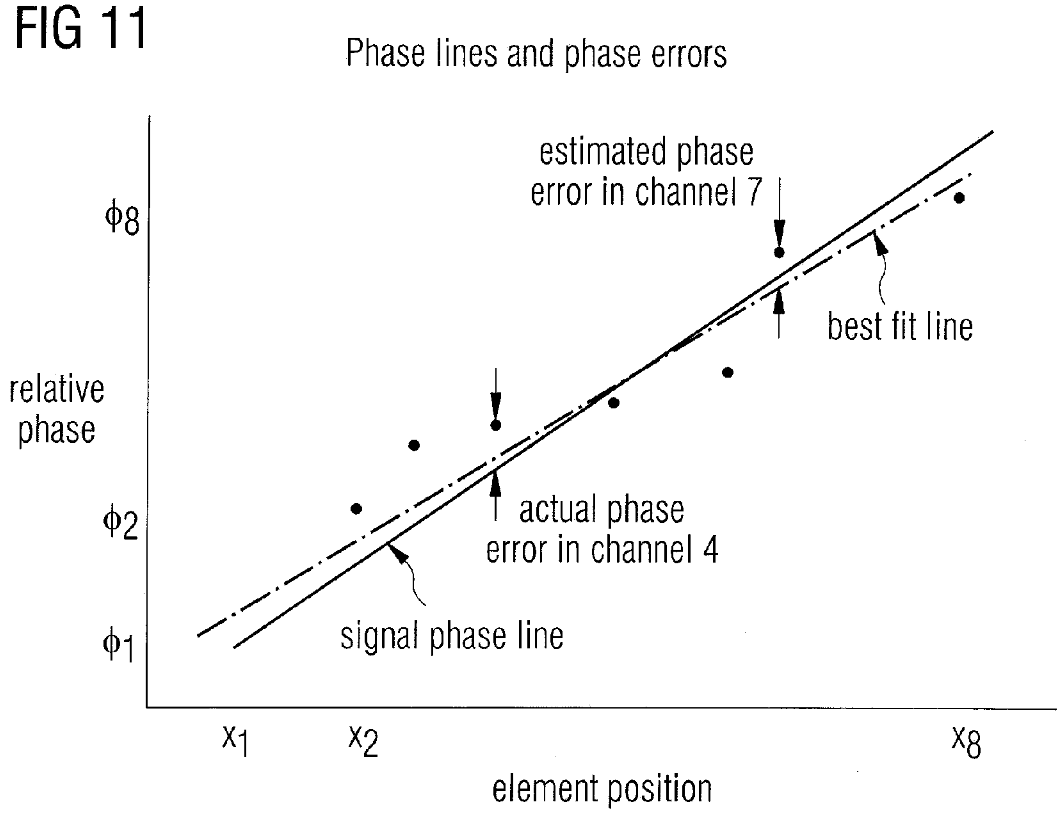
FIG. 11 shows a graphical representation of actual and estimated phase errors in the channels of a phased array antenna.

Table 2 shows five sets of errors for this example. The first line is the set of channel errors taken from the normal distribution with a standard deviation of 10°. The second line gives the cycles of error resulting from the unwrapping process—in this case there is no error in all ten channels. The third line gives the estimated errors across the ten channels, and the fourth is the difference between lines three and one—i.e. the errors in estimating the channel errors. Finally the fifth line removes the mean value from line three (on the basis that a common phase can be subtracted across the array) and an interesting result is observed. The residual errors increment regularly across the array—in other words they correspond to a linear response and so are due to a small error between the true response (corresponding to the signal direction of 30+) and the best fit line. This is not a failure of the method, but a result of the particular finite set of error data used, as indicated in FIG. 11. In this figure the solid line shows the signal phase response line on which the measured points would lie, in the absence of channel phase errors. The measured phases (with the unwrapping corrections) are shown as dots, and the (vertical) distance of these plots from the line are the actual channel phase errors. Their distances from the best fit line (shown dashed) are the estimates of the channel errors. These points do not necessarily lie such that their best fit line lies on, or parallel to, the signal phase line.

Without information of the actual direction of the signal it is impossible to know what is the correct slope and the best that can be done is to make some best fit, in this case based on the least squared error solution. The slope of the best fit line matches that of the signal response if the phase error vector and the element position vector are orthogonal—i.e. if the phases and the positions are uncorrelated. This will not normally be exactly true for finite samples (10 in this simulation case) but would become more nearly true as the number of elements increases.

However, examination of the phase slope error that has been introduced reveals that the DF error this introduces is small. In the example above the phase difference between elements after calibration by this method is 0.5°. With elements at a half wavelength apart the phase difference for a signal at δλ from broadside is 180° sin δθ, or 180° δθ, for a small angle. Thus in this case $\delta\theta = 0.5/180 = 1/360$ radians or about 0.16°. (The DF measurement error increases as $\sec\theta$ with movement to an angle θ from broadside, as the phase difference between elements between θ and $\theta+\delta\theta$ is approximately $180° \cos\theta\delta\theta$ so in this case, $\delta\theta = 0.16° \sec\theta$ and if $\theta = 60°$, for example, $\delta\theta = 0.32°$.

Finally some more examples are presented in Table 3.

TABLE 3

Errors from simulation proram; further examples.

| | | | | | | | | | | |
|---|---|---|---|---|---|---|---|---|---|---|
| Random errors/deg: | −1.9 | 7.3 | −5.9 | 21.8 | −1.4 | 1.1 | 10.7 | 0.6 | −1.0 | −8.3 |
| Unwrap errors/cyc: | 0.0 | 1.0 | 2.0 | 3.0 | 4.0 | 5.0 | 6.0 | 7.0 | 8.0 | 9.0 |
| Est'd errors/deg: | −7.3 | 2.5 | −9.9 | 18.5 | −4.0 | −0.8 | 9.4 | 0.0 | −0.8 | −7.5 |
| Match errors/deg: | −5.4 | −4.7 | −4.0 | −3.3 | −2.7 | −2.0 | −1.3 | −0.6 | 0.1 | 0.8 |
| Diff'l errors/deg: | −3.2 | −2.4 | −1.7 | −1.0 | −0.3 | 0.3 | 1.0 | 1.7 | 2.4 | 3.1 |
| (a) n = 10, Φ = 10, θ = 30 | | | | | | | | | | |
| Random errors/deg: | 8.6 | 2.7 | 6.2 | −10.5 | 15.4 | 4.3 | −19.2 | 4.7 | 12.7 | 6.4 |
| Unwrap errors/cyc: | 1.0 | 1.0 | 1.0 | 1.0 | 1.0 | 1.0 | 1.0 | 1.0 | 1.0 | 1.0 |
| Est'd errors/deg: | 5.6 | −0.3 | 3.2 | −13.6 | 12.2 | 1.2 | −22.4 | 1.5 | 9.5 | 3.1 |
| Match errors/deg: | −3.0 | −3.0 | −3.0 | −3.1 | −3.1 | −3.2 | −3.2 | −3.2 | −3.3 | −3.3 |
| Diff'l errors/deg: | 0.2 | 0.1 | 0.1 | 0.1 | 0.0 | −0.0 | −0.1 | −0.1 | −0.1 | −0.2 |
| (b) n = 10, Φ = 10, θ = 80 | | | | | | | | | | |
| Random errors/deg: | −19.8 | 7.5 | −11.5 | −15.9 | 1.7 | 37.6 | −75.6 | 17.5 | −30.2 | 28.3 |
| Unwrap errors/cyc: | 0.0 | 1.0 | 2.0 | 3.0 | 4.0 | 5.0 | 6.0 | 8.0 | 10. | 12.0 |
| Est'd errors/deg: | −244.8 | −118.1 | −37.8 | 57.2 | 174.0 | 309.3 | 295.4 | 127.9 | −180.6 | −382.7 |
| Match errors/deg: | −224.9 | −125.6 | −26.3 | 73.1 | 172.4 | 271.7 | 371.0 | 110.4 | −150.3 | −411.0 |
| Diff'l errors/deg: | −231.0 | −131.6 | −32.3 | 67.0 | 166.3 | 265.7 | 365.0 | 104.3 | −156.4 | −417.0 |
| (c) n = 10, Φ = 30, θ = 30 | | | | | | | | | | |
| Random errors/deg: | 1.8 | −16.2 | −9.2 | −28.1 | −7.5 | −9.4 | 35.0 | 15.1 | 1.3 | −5.9 |
| Unwrap errors/cyc: | 0.0 | 0.0 | 0.0 | 0.0 | 0.0 | 0.0 | 0.0 | 0.0 | 0.0 | 0.0 |
| Est'd errors/deg: | 14.0 | −6.2 | −104 | −22.5 | −4.1 | −8.2 | 34.0 | 11.9 | −4.1 | −13.4 |
| Match errors/deg: | 12.2 | 10.0 | 7.8 | 5.6 | 3.4 | 1.2 | −1.0 | −3.2 | −5.4 | −7.6 |
| Diff'l errors/deg: | 9.9 | 7.7 | 5.5 | 3.3 | 1.1 | −1.1 | −3.3 | −5.5 | −7.7 | −9.9 |
| (d) n = 10, Φ = 20, θ = 30 | | | | | | | | | | |
| Random errors/deg | 1.7 | 15.3 | 44.7 | 6.5 | 17.3 | 13.6 | 11.1 | 20.0 | 25.2 | 0.9 |
| | −6.3 | 4.5 | 19.9 | 24.3 | −10.9 | 18.2 | −3.4 | −6.7 | 10.8 | 18.6 |
| Diff'l errors/deg: | −6.0 | −5.4 | −4.7 | −4.1 | −3.5 | −2.8 | −2.2 | −1.6 | −0.9 | −0.3 |
| | 0.3 | 0.9 | 1.6 | 2.2 | 2.8 | 3.5 | 4.1 | 4.7 | 5.4 | 3.0 |

In example (a) it can be seen that there is an error of one cycle per element in estimating the unwrapping phases. As this is a linear error across the array it does not affect the error estimates. In example (b) there is an error of one cycle on all the elements. As this is a constant phase error, again it does not affect the estimation of the slope of the line or the error estimates. In this case the residual errors are very small (giving a slope of 0.1° per element) but this is just a consequence of the particular set of errors chosen (and not related to the change of signal direction to 80°). Another run, with the same input arguments, gave errors of 1.8° per element. With high channel errors (from a distribution with a standard deviation of 30° in example (c)) the possibility of errors at the second difference stage occurs, and this is shown here. Here the sixth difference the error is 37.6°−2×(−75.1°)+17.5° which exceeds 180°, resulting in an extra cycle being inserted at this point (and the following points, because of the integration). This has caused the 'corrected' phase to be non-linear and led to errors. This result, however, was only obtained after several runs with these arguments, without this error appearing.

On increasing the s.d. of the channel errors from 10° (in case (a)) to 20° (case (d)) it can be seen that the residual errors increase, from 1.7° per element to 2.2° per element. Of course, these values will vary statistically, and a proper estimate could only be obtained by taking a large number of cases. However, the residual errors can be expected to be generally proportional to the input error magnitudes, given by the standard deviation of the distribution.

It can be expected that increasing the number of elements, and hence the number of points that the best fit process averages over, will reduce the residual errors. Comparison of (e) and (d) shows that the errors have fallen from (−)2.2° per element to 0.6, though again this comparison is for only one run in each case, and a large number should be carried out for firm data.

Figure 12:
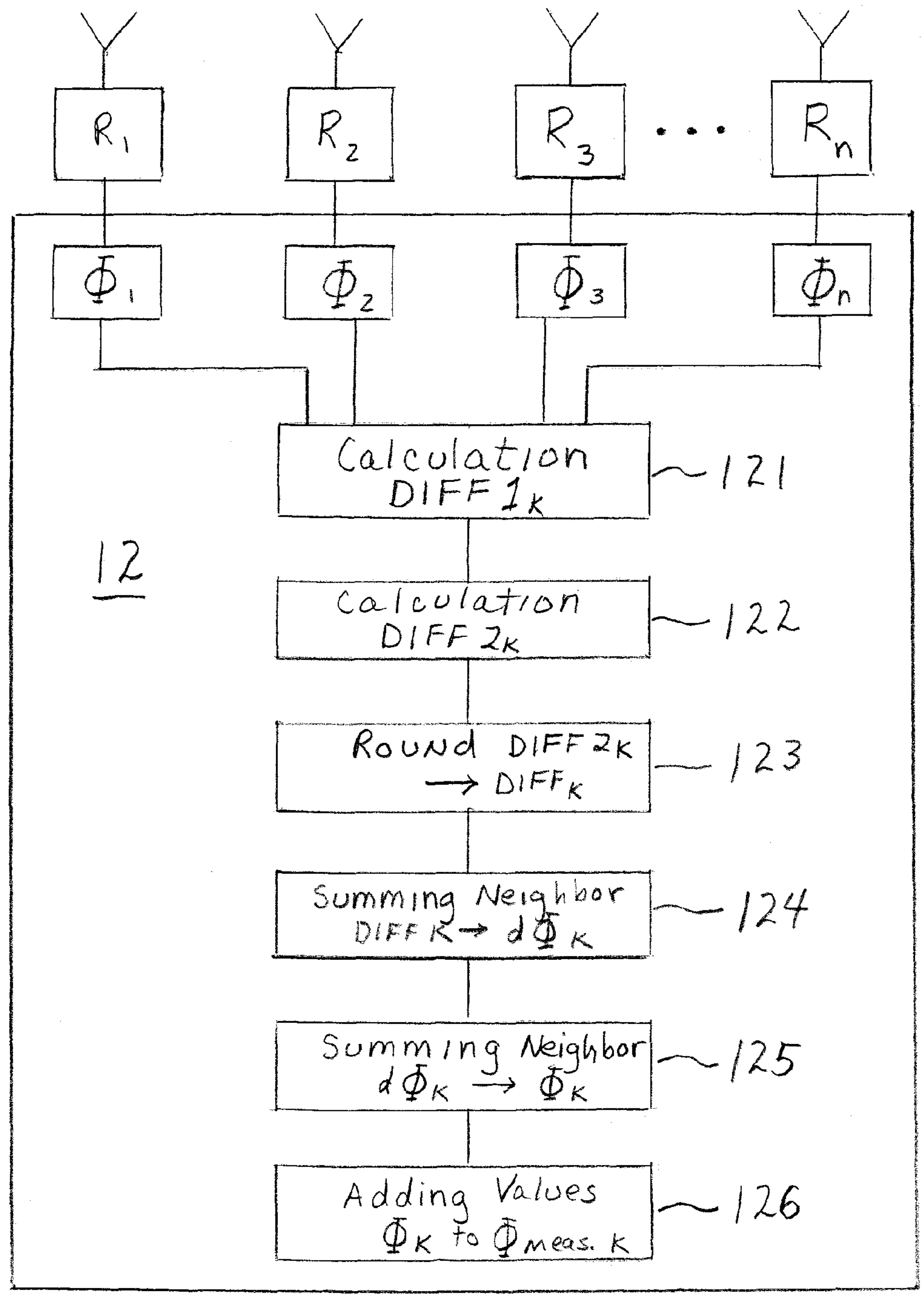
FIG. 12 is a conceptual block diagram of a system according to the invention for calibration of phased array antennas.

Finally, FIG. 12 is a conceptual block diagram which illustrates a system for calibration of phased array antennas according to the invention. As shown in the figure, the apparatus includes receivers $R_{1-n}$ for receiving a signal at a set of n locations, as well as means $\Phi_1 - \Phi_n$ for measuring the phase of the signal at each location to produce a set of n sequential phase values. A calculation unit 121 then calculates the differences between neighboring phase values and the sequence according to the expression $$DIFF1_k = \Phi measured_{k+1} - \Phi measured_k$$

where k=1 to n−1, and $\Phi measured_k$ is the kth phase value in the sequence.

In block 122, the difference between neighboring values of $DIFF1_k$ is calculated according to the expression $$DIFF2_k = DIFF1_{k+1} - DIFF1_k.$$

Thereafter, a rounding unit 123 rounds the values $DIFF2_k$ to the nearest integral multiple of complete phase cycles, to produce a set of rounded values $DIFF_k$.

A summing unit 124 then sums the neighboring values in the set of rounded values $DIFF_k$ to provide a set of values $d\Phi_k$, according to the expression $$d\Phi_{k+1} = d\Phi_k + Diff_k,$$

where $\Phi_1 = 0$ and (k=1 to n−2).

In block 125, neighboring values of $d\Phi_k$ are summed to yield a set of values $\Phi_k$ according to the expression $$\Phi_{k+1}=\Phi_{k+d}\Phi_k,$$

where $\Phi$ 0=0 and k=1 to n−1

Finally, in a calculation unit 126, the values $\Phi_k$ are added to the corresponding values $\Phi\text{measured}_k$ to produce unwrapped phase pulses.

Figure 13:
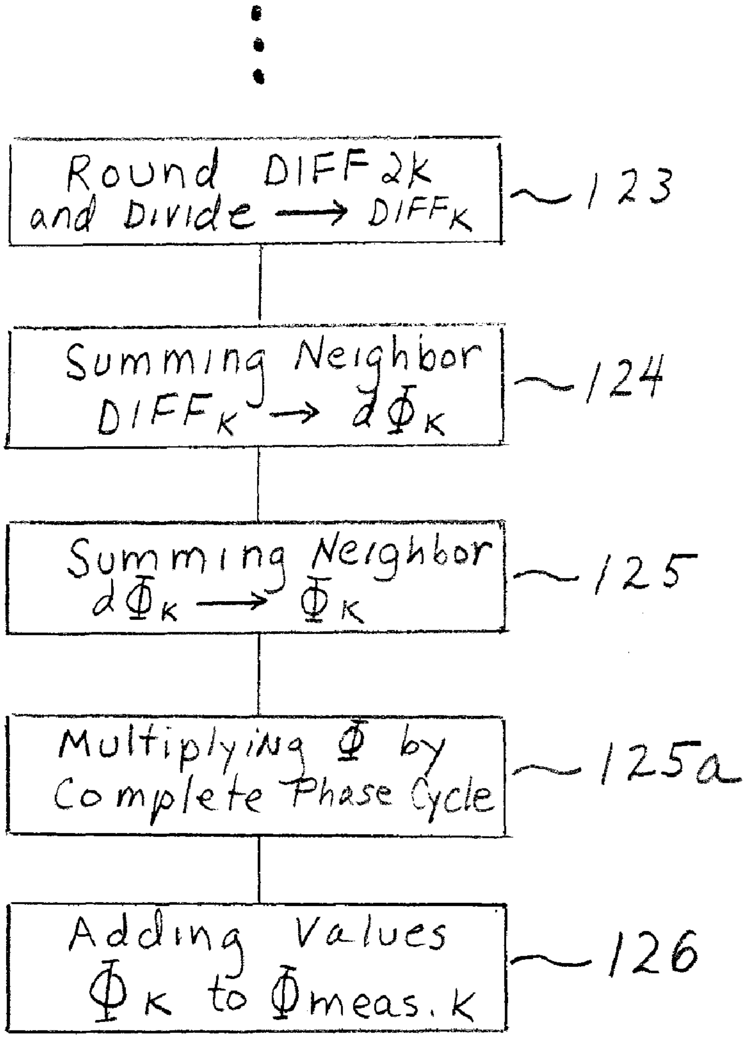
FIG. 13 illustrates a further embodiment of the system of FIG. 12.

As shown in an alternative embodiment of the invention as illustrated in FIG. 13, the summing unit 124 in FIG. 12 may include a provision for dividing the rounded values, $DIFF2_k$, by one complete phase cycle in order to produce the integer values $DIFF_k$, and in addition, a further calculation unit 125*a*, may be provided in which the values $\Phi_k$ are multiplied by one complete cycle before adding to the corresponding values $\Phi\text{measured}_k$ in block 126.

It should be noted that the invention also includes the system described above, and illustrated in FIGS. 12 and 13, in which the respective calculation blocks 121-126, as well as the phase measuring units $\Phi_1$–$\Phi_n$ are provided in the form of a suitably programmed computer (12).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of processing a signal received by a phased array antenna, said method comprising:

(i) receiving the signal via a plurality of antenna elements of said phased array antenna, said antenna elements being situated at a set of n loci;

(ii) measuring the phase of the signal at each locus to produce a set of n sequential phase values;

(iii) calculating the differences between neighboring phase values in the sequence according to:

$$DIFF1_k=\Phi\text{measured}_{k+1}-\Phi\text{measured}_k\ (k=1 \text{ to } n-1)$$

where $\Phi\text{measured}_k$ is the kth phase value in the sequence;

(iv) calculating the differences between neighboring values of $DIFF1_k$ according to:

$$DIFF2_k=DIFF1_{k+1}-DIFF1_k\ (k=1 \text{ to } n-2)$$

(v) rounding the values of $DIFF2_k$ to the nearest integral multiple of complete phase cycles to produce the set of rounded values $DIFF_k$;

(vi) summing neighboring values in the set of rounded values $DIFF_k$ to provide a set of values, $d\Phi_k$, according to:

$$d\Phi_{k+1}=d\Phi_k+\text{Diff}_k$$

$$d\Phi_1=0\ (k=1 \text{ to } n-2)$$

(vii) summing neighboring values of $d\Phi_k$ to give the set of values $\Phi_k$ according to:

$$\Phi_{k+1}=\Phi_k+d\Phi_k$$

$$\Phi_0=0\ (k=1 \text{ to } n-1)$$

and (viii) adding the values $\Phi_k$ to the corresponding values $\Phi\text{measured}_k$ to produce unwrapped phase values.

2. The method of claim 1, further including the step (ix) of dividing the rounded values, $DIFF2_k$, by one complete phase cycle to produce integer values of $DIFF_k$ and multiplying the values $\Phi_k$ by one complete phase cycle before adding to the corresponding values $\Phi\text{measured}_k$.

3. The method of claim 1, where the signal is received at a set of n elements in an array antenna.

4. The method of claim 3 where the steps (iii)-(viii) or (iii)-(ix) are performed by a computer.

5. Apparatus for processing a signal comprising:

(i) means for receiving the signal at a set of n loci, (ii) means for measuring the phase of the signal at each locus to produce a set of n sequential phase values;

(iii) means for calculating the differences between neighboring phase values in the sequence according to:

$$DIFF1_k=\Phi\text{measured}_{k+1}-\Phi\text{measured}_k\ (k=1 \text{ to } n-1)$$

where $\Phi\text{measured}_k$ is the kth phase value in the sequence;

(iv) means for calculating the differences between neighboring values of $DIFF1_k$ according to:

$$DIFF2_k=DIFF1_{k+1}-DIFF1_k\ (k=1 \text{ to } n-2)$$

(v) means for rounding the values of $DIFF2_k$ to the nearest integral multiple of complete phase cycles to produce the set of rounded values $DIFF_k$;

(vi) means for summing neighboring values in the set of rounded values $DIFF_k$ to provide a set of values, $d\Phi_k$, according to:

$$d\Phi_{k+1}=d\Phi_k+\text{Diff}_k,\ \Phi_1=0\ (k=1 \text{ to } n-2)$$

(vii) means for summing neighboring values of $d\Phi_k$ to give the set of values $\Phi_k$ according to:

$$\Phi_{k+1}=\Phi_k+d\Phi_k,\ \Phi_0=0\ (k=1 \text{ to } n-1)$$

and (viii) means for adding the values $\Phi_k$ to the corresponding values $\Phi\text{measured}_k$ to produce unwrapped phase values.

6. The apparatus of claim 5, further comprising (ix) means for dividing the rounded values, $DIFF2_k$, by one complete phase cycle to produce integer values of $DIFF_k$ and multiplying the values $\Phi_k$ by one complete phase cycle before adding to the corresponding values $\Phi\text{measured}_k$.

7. The apparatus of claim 5, wherein the means for receiving the signal at a set of n loci comprises an antenna array having n elements.

8. The apparatus of claim 5 wherein the features (ii)-(viii) are provided by a computer.

* * * * *